Feb. 9, 1926.

T. M. FINLEY 1,572,522

TANDEM MOTOR POWER UNIT

Filed Sept. 28, 1918    4 Sheets-Sheet 1

Witness
Chas. L. Griesbauer

Inventor
Thomas M. Finley,
By N. J. Riley
Attorney

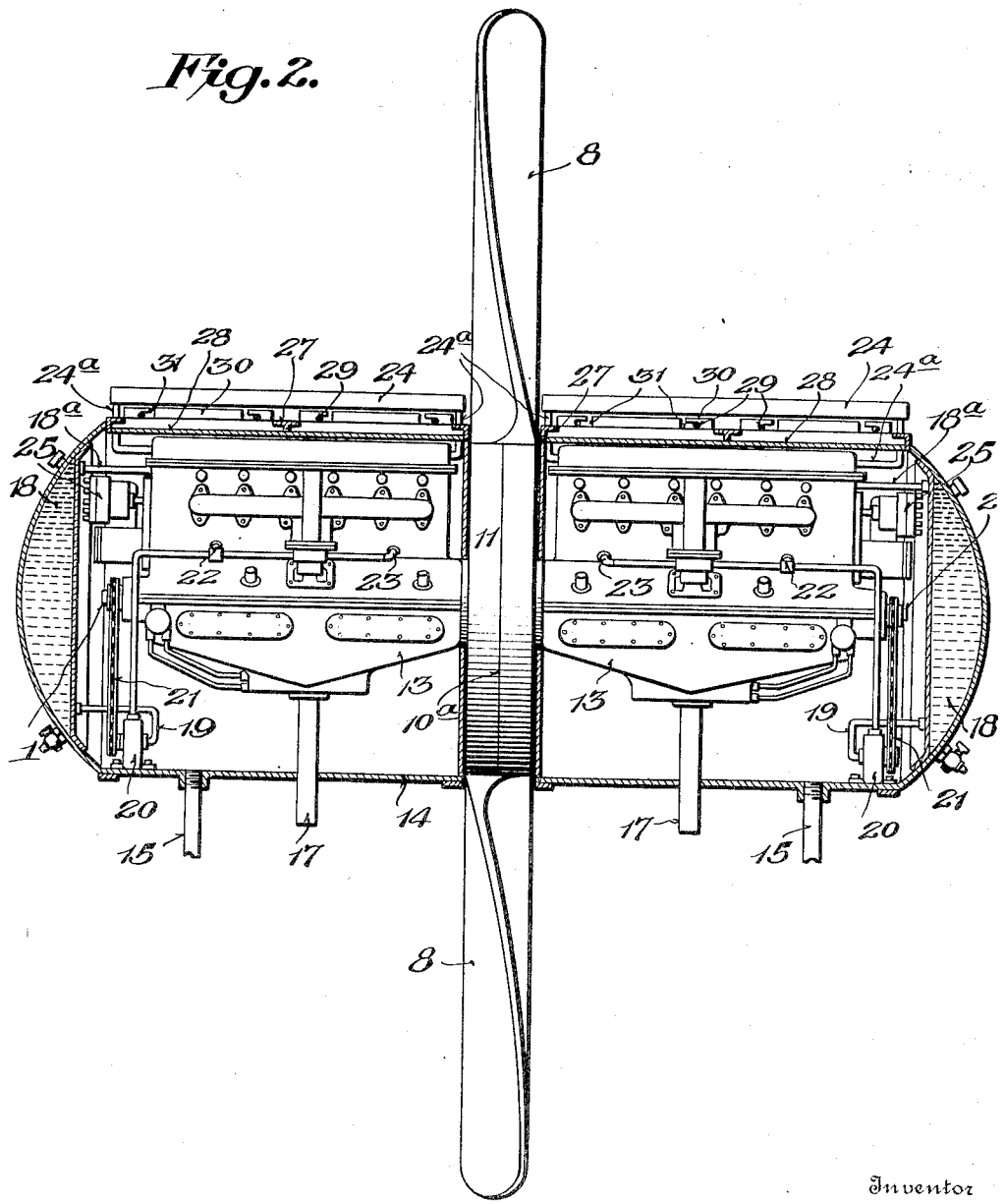

Feb. 9, 1926.                                      1,572,522
T. M. FINLEY
TANDEM MOTOR POWER UNIT
Filed Sept. 28, 1918          4 Sheets-Sheet 3
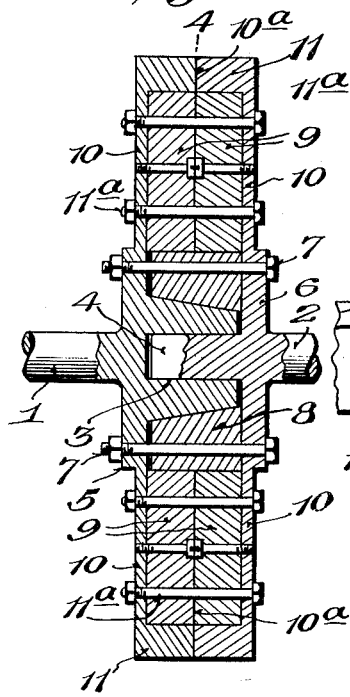
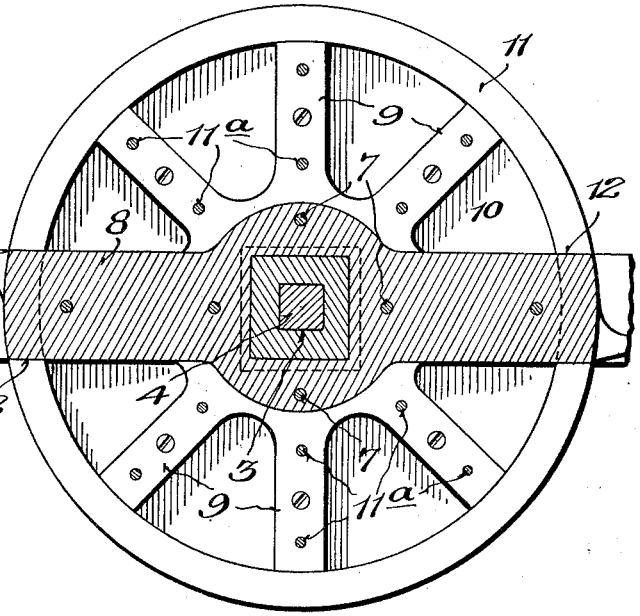
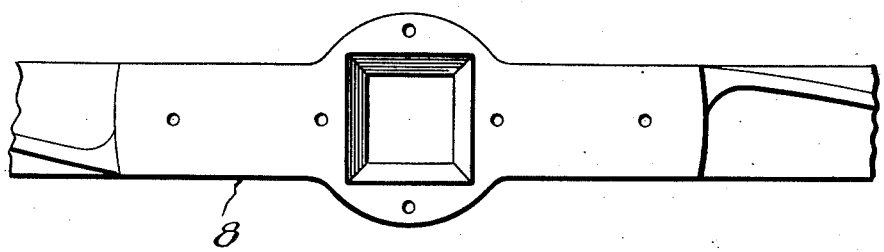

Feb. 9, 1926.  1,572,522
T. M. FINLEY
TANDEM MOTOR POWER UNIT
Filed Sept. 28, 1918    4 Sheets-Sheet 4
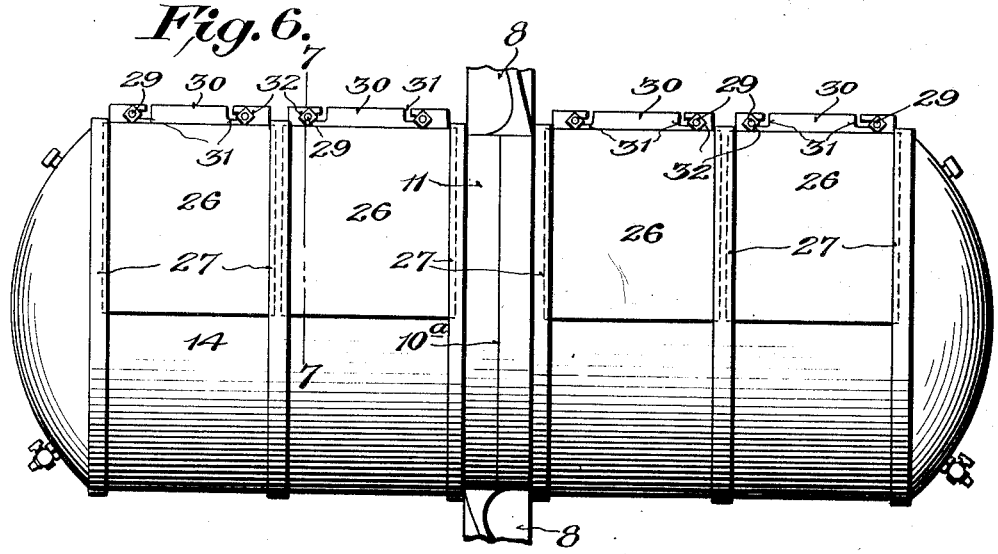
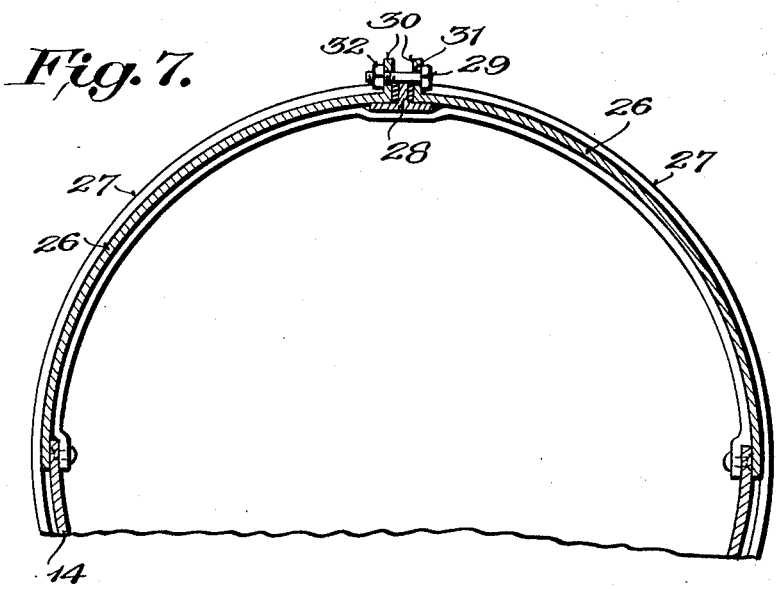

Patented Feb. 9, 1926.

1,572,522

UNITED STATES PATENT OFFICE.

THOMAS M. FINLEY, OF ST. LOUIS, MISSOURI.

TANDEM MOTOR POWER UNIT.

Application filed September 28, 1918. Serial No. 256,035.

*To all whom it may concern:*

Be it known that I, THOMAS M. FINLEY, a citizen of the United States, residing at St. Louis city, State of Missouri, have invented certain new and useful Improvements in Tandem Motor Power Units, of which the following is a specification.

The invention relates to a tandem motor power unit.

The object of the present invention is to improve the construction of aeronautical engines and to provide a tandem motor power unit adapted for use on various types of flying machines and aeroplanes, but designed especially for flying machines of the Finley type and equipped with a propeller and with means for driving the same.

A further object of the invention is to provide a well balanced tandem motor power unit having bearings at opposite sides of the propeller and adapted to cause the gyroscopic effect to be absorbed in the engine weight and not by the machine and capable of producing a smooth running propeller and a steady motion with minimum vibration.

A further object of the invention is to provide a motor power unit which will be easy to lubricate and avoid the evils incident to the lubrication of eight and twelve cylinder engines of the V type and enable the power to be applied centrally of the shaft and obviate the necessity of placing the pistons in a cramped position and thereby produce an increase in friction, heat and wear out of all proportion to the horsepower developed.

It is also an object of the invention to provide a power unit adapted to increase the hours of engine life and possessing increased efficiency for weight, size and build and capable of enabling increased weight to be advantageously employed where such increase in strength and efficiency may be employed in aeronautics as can be in the Finley type of machine.

Furthermore, it is an object of the invention to avoid the evils resulting from the development of engines to meet the requirements of the aeroplane art and to provide sufficient space to permit free action and smooth movement of all the parts and to go a long ways toward solving the aeroplane engine problems in producing a safe, reliable, high power engine characterized by extreme simplicity and an embodiment of tried principles.

A further object of the invention is to provide a tandem motor power unit which unlike the aeroplane engine, will be built upon the lines of a stationary combustion engine and possess all the advantages of the use of fuels as engines of automobiles, yachts and the like.

With these and other objects in view, the invention consists in the construction and novel combination and arrangement of parts hereinafter fully described, illustrated in the accompanying drawings and pointed out in the claims hereto appended, it being understood that various changes in the form, proportion, size and minor details of construction, within the scope of the claims, may be resorted to without departing from the spirit or sacrificing any of the advantages of the invention.

In the drawings:—

Figure 2 is a longitudinal sectional view of one of the tandem motor power units.

Figure 3 is an enlarged detail sectional view through the propeller taken longitudinally of the crank shaft.

Figure 4 is a similar view taken transversely of the crank shaft.

Figure 5 is an enlarged detail view of the central portion of the propeller blades.

Figure 6 is an elevation of the tandem motor power unit, parts being omitted.

Figure 7 is a transverse sectional view illustrating the construction of the slidable closures of the outer casing.

Figure 1:
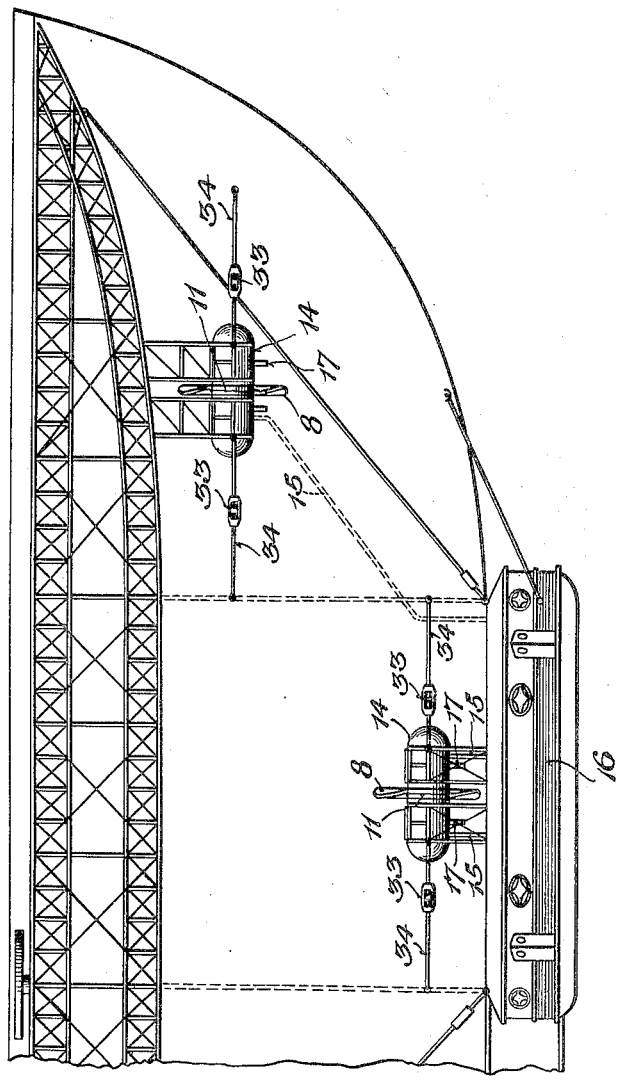
Figure 1 is a longitudinal sectional view partly in elevation of a portion of a flying machine of the Finley type provided with tandem motor power units constructed in accordance with this invention.

In the accompanying drawings, in which is illustrated the preferred embodiment of the invention, 1 and 2 designate crank shafts of engine sections connected centrally of the tandem motor power unit by a coupling comprising a socket 3 and a polygonal terminal portion 4 conforming to the configuration of the socket and preferably rectangular in cross section, as shown. While the socket and the terminal coupling portion 4 are shown square they may be of any other desired non-circular shape and the said shafts 1 and 2 are provided with flanges 5 and 6 connected together by transverse bolts 7 which firmly clamp the side plates or flanges 6 against the sides of propeller blades 8 and spokes 9. A coupling formed by the terminal portion 4 and the socket 3 constitute the hub of the propeller and the socket is preferably exteriorly tapered to form a wedge for tightly engaging the spokes and the propeller blades when the parts are assembled and the members of the coupling are drawn into firm engagement with the blades and spokes. The propeller blades are two in number and six spokes are preferably provided as shown, but any desired number of spokes and propeller blades may of course be employed and the side blades or flanges 5 and 6 are preferably provided with radial extensions 10 fitting against the sides of the inner portions of the propeller blades and the side faces of the spokes and connected by suitable fastening devices, and extending to and formed integral with the rim.

The propeller is equipped with a fly wheel rim 11 having openings 12 for the propeller blades constructed of any suitable metal adapted to afford the desired weight and strength to provide a fly wheel of the required capacity. The spokes and the rim are circumferentially split at 10ª to form two circular clamping sections which are adapted to fit together to form a fly wheel and to clamp the propeller blades and they enable the latter to be readily placed in and removed from the clamping and holding means formed by the sectional fly wheel or center. The two sections of the spokes and the rim fit together in interlocked relation and are correspondingly grooved for this purpose so as to make a close, tight and secure fit or joint. The coupling members or sections and the flanges, and the spokes and the rim of the fly wheel transmit the power of the crank shafts from the center of the hub or coupling to the effective portion of the propeller blades at the periphery of the rim where they pass through the same and the structure thereby affords increased strength and security to the propeller blades. The spoke and rim sections are securely and detachably fastened by bolts 11ª and the propeller blades are firmly held in the rim sections by the bolts 11ª and by the clamping action of the shaft coupling which serves as the hub of both the fly wheel and the propeller. The construction will enable the engine sections 13 and the propeller, which constitute the tandem motor power unit, to be readily assembled and securely fastened together. The engine sections which in practice will have a single timing mechanism operating as a single engine and the cylinders and pistons thereof are arranged in a vertical position and any type of internal combustion engine may be employed in the construction of the tandem motor power unit. The crank shafts are arranged in longitudinal alinement in abutting relation and constituting a single sectional power unit shaft and the power is applied centrally of the power unit shaft and the engine sections may be equipped with any number of cylinders and they are arranged in close or practically contiguous relation to the propeller which is driven by power applied at opposite sides of it producing an evenly balanced engine with the propeller centrally thereof.

The engine sections are arranged within air-tight envelopes consisting of substantially cylindrical casings 14 with which are connected air supply pipes 15 extending from the casings to the cabin 16 and designed to supply air under pressure of any density and temperature to the casings 14 and to insure a sufficient amount of air to enable the engines to operate with their greatest efficiency in all altitudes. The air is designed to be supplied to the casings by one or more air pumps or compressors located within the cabin but the air may be supplied to the casings of the engines by any other suitable means and the air pumps or compressors may be located at any other convenient point. The exhaust pipes 17 which are connected with the exhaust manifolds of the engine sections extend through the casings and discharge into the atmosphere at any convenient point.

Each engine section is equipped with a cooling system comprising a substantially semi-spherical tank or reservoir 18 located at the outer end of the cylindrical casing of each engine section and suitably secured to the same and presenting a rounded end face adapted to reduce to a minimum the air resistance of the power unit. The cylindrical casings to which the engine sections are suitably bolted are of a diameter to lie within the scroll of the propeller blades and do not extend to the effective portion of the said blades or interfere with the efficiency of the same and the semi-spherical reservoirs or tanks form rounded ends or heads for both ends of the tandem motor power unit so that the air resistance will be reduced to a minimum when the flying machine is moving either backwardly or forwardly. The tanks or reservoirs are located at each end of the power unit and the water jacket of each engine section is connected by a pipe 19 with a pump 20 preferably located at the bottom of the casing 14 at the outer end thereof and connected with the crank shaft of the engine unit by sprocket gearing 21 but any other suitable form of gearing may of course be employed for transmitting motion from the crank shaft to the pump and the latter communicates with the tank or reservoir and is adapted to cause a positive circulation of water. The tank or reservoir 18 is connected at the upper portion at the outer end with the jacket of the engine by a pipe 18ⁿ and at the inner end with an exterior substantially horizontal radiator 24 by pipes 23. The radiator 24 is located above and extends longitudinally of the engine casing and may be of any desired construction, as will be readily understood. The air supply tube 15 is a thermos tube so as not to be affected by the temperature of the atmosphere, and air of any temperature and density may be delivered to the engine sections to enable the same to operate with their greatest efficiency and any suitable means may be employed for delivering the air to the casings or envelopes and for controlling the pressure and temperature of the same to suit various conditions and requirements. The location of the air deflecting outwardly tanks or reservoirs at the outer ends of the casings will expose the same to the action of the air and the low temperature of high altitudes and they will constitute efficient cooling means for the engine sections. The radiator is connected with the water jacket of the engine section by one or more pipes 24ᵃ and may be of any desired construction as will be readily understood. The radiator will supply cold water to the engine and the effect of the cold water may be modified by heated air delivered to the engine through the air tube from any suitable air heating means, and when it is desired to lower the temperature of the engine, the temperature of the air delivered to the casing or envelope through the thermos air tube, may be reduced to the desired degree or ordinary atmospheric air may be delivered to the engine or air below the temperature of the atmosphere. In this manner the temperature of the engine may be controlled and maintained at any predetermined degree by means of the cold water of the radiator and the heating means of the cabin or other point of supply.

The tandem motor power unit is equipped with an engine starter 25 located at the rear end of the rear engine section but it may be arranged at any other desired point and only one starter is necessary for each tandem motor power unit, as it is connected with the coupled crank shafts and the latter form a single continuous tandem motor power unit shaft and the two sets of cylinders or engine sections constitute a single motor or engine with the cylinders arranged in a vertical position at opposite sides of the propeller. The inner ends of the air-tight casings or envelopes are arranged adjacent to but slightly spaced from the propeller fly wheel at opposite sides of the same and they do not interfere with the free rotary movement of the propeller or the effectiveness of the blade portions of the same and the said casings or envelopes with the semi-spherical tanks or reservoirs are of substantially the same diameter as the fly wheel of the propeller and reduce the air resistance of the central or fly wheel portion of the propeller and deflect the air to the blades of the propeller for enabling the latter to operate with increased efficiency. The cylinders of the engine sections are vertical and the pistons operate in a vertical position so that no difficulty will be experienced in the oiling of the engine sections in which any efficient oiling system may be employed. Also the arrangement and type of the engine sections are such that they are adapted to use any fuel which may be used in any internal combustion engine. Also the central application of the power of the tandem motor power unit to the propeller and the distribution of the cylinders of the power unit at opposite sides of the propeller enable a power unit of any number of cylinders to be employed and eliminate the evils and difficulties experienced in attempting to crowd a large number of cylinders at one side of a propeller. Also the application of the power centrally of the power unit crank shaft and the arrangement of the cylinders at both ends of the shaft will eliminate the torque or strains tending to twist and break the shaft and resulting from applying at one end of the shaft the power developed by the engine or motor.

In order to afford access to the engine sections, the outer casing 14 of each engine section is equipped with a plurality of doors 26 mounted in guides or ways 27 and located at opposite sides of the upper portion of the casing and arranged in pairs, the members of each pair being secured together at the longitudinal supporting bar or member 28 by bolts 29 or other suitable fastening means. The doors, which are slidable in the said guides or ways, are arcuate and may be of any desired number so as to expose the engine sections to a greater or less degree and they are adapted to slide downwardly in opening and upwardly in closing, and they are curved transversely of the cylindrical casing to constitute a portion of the same when closed. The guides or ways are curved and are preferably constructed of channelled material as shown, but the slidable doors may be guided in any desired manner and the guides or ways and the supporting bar are equipped with rubber packing or other suitable material for rendering the casing air tight when the doors are closed and clamped in their closed position by the said bolts 29.

The longitudinal supporting strip is preferably T shaped in cross sections as shown, to form a central flange or abutment for the adjacent edges of the slidable doors and the latter are provided at their upper edges with flanges 30, preferably provided with slots 31 for the reception of the bolts 29. The bolts 29 are preferably provided with nuts 32, having suitable handles for enabling them to be readily turned to clamp the flanges of the doors tightly in engagement with the supporting strip and the said guides or ways. By opening the sliding doors, access may be had to any portion of the engine section. Any other suitable means may, of course, be employed for rendering the casing air tight for enabling the air to be supplied to the engine sections without leakage. The engine sections may be provided with separate interior air envelopes or containers for supplying air to the engine sections. The outer casings 14 may then be used as a shield or housing and it will protect the engine sections and reduce the air resistance to a minimum.

When it is desired to separate the engine sections, the nuts of the connecting bolts of the propeller and spokes are removed and the engine sections may then be readily pulled apart by the turn-buckles 33 of cables 34 connected with the tandem motor power unit for bracing and maintaining the latter in proper position. By operating the turn-buckles, the sections of the tandem motor power unit may be separated sufficiently to enable propeller blade to be placed in and removed from the crank shafts. While the stay cables and their turn-buckles form convenient means for pulling the engine sections apart, any other suitable means may, of course, be employed for this purpose and in practice the engine sections and their casings will be slidably or movably mounted to facilitate ready separation and assembling of the sections. The supporting frames or hangers of the engine sections may be provided with guiding means for the engine sections and their casings, or they may be slidably or movably mounted to permit such separation and assembling of the said engine sections.

What is claimed is:

1. A tandem motor power unit including spaced engine sections having longitudinally alined crank shafts provided with side plates or flanges, and a propeller located between the engine sections and adapted to take the power from the power unit centrally thereof and comprising blades, a fly wheel rim and spokes, said blades and spokes being clamped between the side plates or flanges and the shafts having relative longitudinal movement to clamp and release the blades.

2. A tandem motor power unit including spaced engine sections having longitudinally alined crank shafts, one of the crank shafts being provided with a polygonal socket and the other crank shaft having a polygonal coupling terminally fitting the said socket, a propeller operating between the engine sections, and means for securing the propeller to the inner ends of the crank shafts, whereby power is taken from the power unit centrally thereof.

3. A tandem motor power unit including engine sections having longitudinally alined crank shafts, one of the crank shafts having a socket at its inner end and the other being provided at the inner end with a coupling terminally fitting the socket, said shafts being also provided with spaced side plates, and a propeller mounted upon the crank shafts and secured between the said side plates, whereby power is taken from the power unit centrally thereof.

4. A tandem motor power unit including engine sections having longitudinally alined crank shafts, one of the crank shafts being provided at the inner end with a socket and the other having a terminal portion at the inner end fitting the socket, said crank shafts being also provided with spaced side plates or flanges, a propeller operating between the engine sections and comprising blades, a fly wheel rim and spokes, and fastening devices connecting the side plates or flanges and securing the propeller blades and the spokes between the same, whereby the power is taken from the power unit at a point intermediate of the ends thereof.

5. A tandem motor power unit including engine sections having longitudinally alined crank shafts, one of the crank shafts being provided at the inner end with a socket and the other having a terminal portion at the inner end fitting the socket, said crank shafts being also provided with spaced side plates or flanges, a propeller operating between the engine sections and comprising blades, a fly wheel rim and spokes, and fastening devices connecting the side plates or flange and securing the propeller blades and the spokes between the same, whereby the power is taken from the power unit between the ends thereof said side plates being provided at the spokes and the blades with radial extensions or arms.

6. A tandem motor power unit including spaced longitudinally aligned engine sections having water jackets, a propeller located between the engine sections and actuated by the same, whereby the power is taken from the power unit centrally thereof, separate substantially cylindrical casings located at opposite sides of the propeller and receiving the engine sections, means for supplying air to the said casings and tapered tanks arranged at the outer ends of the casings, and means for connecting the tanks with the water jackets of the engine sections.

7. A tandem motor power unit including spaced engine sections having water jackets having longitudinally alined crank shafts, a propeller operating between the engine sections, means for connecting the propeller with the said crank shafts, whereby the power is taken from the power unit centrally thereof, separate substantially cylindrical casings receiving the engine sections and forming air-tight envelopes for the same, and approximately semi-spherical tanks secured to the outer ends of the said casings and connected with the water jackets of the engine sections.

8. A tandem motor power unit including longitudinally aligned engine sections, a propeller operating between the engine sections, means for connecting the propeller with the same, whereby the power is taken from the power unit centrally thereof, separate casings located at opposite sides of the propeller and receiving the engine sections, tanks carried by the casings at the outer ends thereof, and pumps located within the casings and actuated by the engine sections and connected with the said tanks and with the water jackets of the engine sections for causing a positive circulation of water.

9. A tandem motor power unit including longitudinally aligned engine sections, a propeller operating between the same, means for connecting the propeller with the engine sections, whereby the power is taken from the power unit centrally thereof, cooling means for the engine sections comprising tanks located at the outer ends of the engine sections, pumps connected with the tanks and the water jackets of the engine sections, radiators, and means for connecting the radiators with the tanks and the water jackets of the engine sections.

10. A tandem motor power unit including longitudinally aligned engine sections, a propeller operating between the engine sections, means for connecting the propeller with the engine sections, whereby the power is taken from the power units centrally thereof, separate casings receiving the engine sections and means for cooling the latter comprising tanks carried by the casings, radiators connected with the tanks and with the water jackets of the engine sections, pumps connected with the water jackets of the engine sections and with the tanks for causing a positive circulation of the water, and means for operating the pumps.

11. A tandem motor power unit including longitudinally aligned engine sections, a propeller operating between the engine sections, means for connecting the propeller with the engine sections, whereby the power is taken from the power unit centrally thereof, separate casings receiving the engine sections and means for cooling the latter comprising tanks or reservoirs carried by the casings, radiators located above the casings and connected with the tanks or reservoirs and with the water jackets of the engine sections and with the tanks or reservoirs for causing a positive circulation of the water, gearing carried by the engine sections for operating the pumps, and means for supplying the casings with air.

12. A tandem motor power unit including longitudinally aligned engine sections, a propeller operating between the engine sections, means for connecting the propeller with the engine sections, whereby the power is taken from the power unit centrally thereof and cooling means for the engine sections including tanks or reservoirs located at the outer ends of the engine sections, a radiator, and pumps arranged at the lower portions of the tanks or reservoirs for causing a positive circulation of water from the tanks or reservoirs to the water jackets of the engine sections and the radiator.

13. A tandem motor power unit including longitudinally aligned engine sections, a propeller operating between the engine sections, means for connecting the propeller with the engine sections, whereby the power is taken from the power unit centrally thereof and cooling means for the engine sections including a radiator, tanks or reservoirs located at the outer ends of the engine sections, and pumps arranged at the lower portions of the tanks or reservoirs for causing a positive circulation of water from the tanks or reservoirs to the water jackets of the engine sections and the radiator, said tanks or reservoirs forming outwardly tapered heads.

14. A tandem motor power unit including longitudinally aligned engine sections, a propeller operating between the engine sections, means for connecting the propeller with the engine sections, whereby the power is taken from the power unit centrally thereof and cooling means for the engine sections including a radiator, tanks or reservoirs located at the outer ends of the engine sections, and pumps arranged at the lower portions of the tanks or reservoirs for causing a positive circulation of water from the tanks or reservoirs to the water jackets of the engine sections, said tanks or reservoirs forming outwardly tapered heads and being of a diameter as great as that of the said engine sections.

15. A tandem motor power unit including longitudinally aligned engine sections and a propeller operating between and connected with the propeller sections, whereby the power is taken from the power unit centrally thereof comprising a rim circumferentially split to form clamping members or sections and propeller blades clamped between the sections or members, said sections or members being laterally separable to permit the removal of the propeller blades.

16. A tandem motor power unit, including engine sections having separate longitudinally aligned crank shafts, a propeller, means for connecting the propeller with the inner ends of the crank shafts whereby the power is taken from the power unit centrally thereof, a casing receiving and entirely enclosing the engine and forming an air envelope for the same, cooling means for the engine having a radiator element arranged exterior of the casing in a horizontal position upon the top of the same, and means for supplying the casing with air.

17. A tandem motor power unit, including longitudinally aligned engine sections having separate crank shafts, means for connecting the crank shafts and for carrying the power of the unit from the same centrally thereof, a casing receiving and entirely enclosing the engine sections and forming an air envelope for the same, cooling means for the engine having a radiator extending above the casing horizontally of the top thereof, and means for supplying the casing with air.

In testimony whereof I affix my signature.

THOMAS M. FINLEY.